United States Patent
Saito

(10) Patent No.: US 10,209,932 B2
(45) Date of Patent: Feb. 19, 2019

(54) PRINTING APPARATUS THAT PROCESSES PRINT DATA BASED ON SECURITY SETTING DATA

(71) Applicants: KABUSHIKI KAISHA TOSHIBA, Tokyo (JP); TOSHIBA TEC KABUSHIKI KAISHA, Tokyo (JP)

(72) Inventor: Akira Saito, Mishima Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/945,122

(22) Filed: Apr. 4, 2018

(65) Prior Publication Data

US 2018/0225072 A1  Aug. 9, 2018

Related U.S. Application Data

(63) Continuation of application No. 14/820,643, filed on Aug. 7, 2015, now Pat. No. 9,940,078.

(51) Int. Cl.
*G06F 3/12* (2006.01)
*G06F 21/60* (2013.01)

(52) U.S. Cl.
CPC .......... *G06F 3/1222* (2013.01); *G06F 3/1238* (2013.01); *G06F 3/1239* (2013.01); *G06F 3/1273* (2013.01); *G06F 3/1285* (2013.01); *G06F 21/608* (2013.01)

(58) Field of Classification Search
CPC combination set(s) only.
See application file for complete search history.

(56) References Cited

U.S. PATENT DOCUMENTS

| | | | |
|---|---|---|---|
| 6,602,298 B1 * | 8/2003 | Kirshenbaum | G06F 21/608 382/306 |
| 2005/0134896 A1 | 6/2005 | Koga | |
| 2010/0272449 A1 | 10/2010 | Yoshida et al. | |
| 2012/0314242 A1 | 12/2012 | Kakutani | |
| 2013/0070305 A1 | 3/2013 | Tomizawa et al. | |
| 2014/0212157 A1 | 7/2014 | Ishikawa | |
| 2015/0278669 A1 | 10/2015 | Akiyama et al. | |
| 2016/0105584 A1 | 4/2016 | Roche et al. | |

* cited by examiner

*Primary Examiner* — Helen Zong
(74) *Attorney, Agent, or Firm* — Kim & Stewart LLP

(57) ABSTRACT

A printing apparatus includes a data storage, a first printer, a communication interface, and a controller. The controller is configured to determine a security level of print data received, based on security setting data for the print data, when determining that the security level is a first security level, control the first printer to print the print data with the decolorable material and control the data storage to store the print data and the security setting data for the print data, and when determining that the security level is a second security level that is lower than the first security level, control the first printer to print the print data with the decolorable material and control the data storage not to store the print data and store the security setting data for the print data in the data storage.

16 Claims, 6 Drawing Sheets

PRINTING APPARATUS THAT PROCESSES PRINT DATA BASED ON SECURITY SETTING DATA

CROSS-REFERENCE TO RELATED APPLICATION

This application is a continuation of U.S. patent application Ser. No. 14/820,643, filed on Aug. 7, 2015, the entire contents of which are incorporated herein by reference.

FIELD

Embodiments described herein relate generally to a printing apparatus, in particular a printing apparatus that processes print data based on security setting data.

BACKGROUND

A printing apparatus such as multi function peripheral (MFP) or the like forms an image on a sheet based on image data received from an external apparatus.

A printing apparatus of one type forms an image on a sheet with a decolorable material. The image formed with the decolorable material can be erased when the printed image is no longer needed. The decolorable material is usually decolored when heated to a high temperature. Since the sheet from which the image has been erased can be used for printing again, using the decolorable material leads to reduction of sheets and further to conservation of the environment.

However, a document having images formed with the decolorable material may be falsified, for example, by erasing partially or completely the images formed with the decolorable material and replacing them with different images. It would be desirable if such a risk can be minimized.

DETAILED DESCRIPTION

In general, according to one embodiment, a printing apparatus includes a data storage, a first printer configured to perform printing with a decolorable material, a communication interface, and a controller configured to determine a security level of print data received by the communication interface, based on security setting data for the print data, that is received by the communication interface, when determining that the security level is a first security level, control the first printer to print the print data with the decolorable material and control the data storage to store the print data and the security setting data for the print data received by the communication interface, and when determining that the security level is a second security level that is lower than the first security level, control the first printer to print the print data with the decolorable material and control the data storage not to store the print data and store the security setting data for the print data received by the communication interface in the data storage.

Hereinafter, an embodiment for implementing the invention will be described with reference to the accompanying drawings. In addition, the same members are used for the same elements in each of the drawings.

(First Embodiment)

Figure 1:
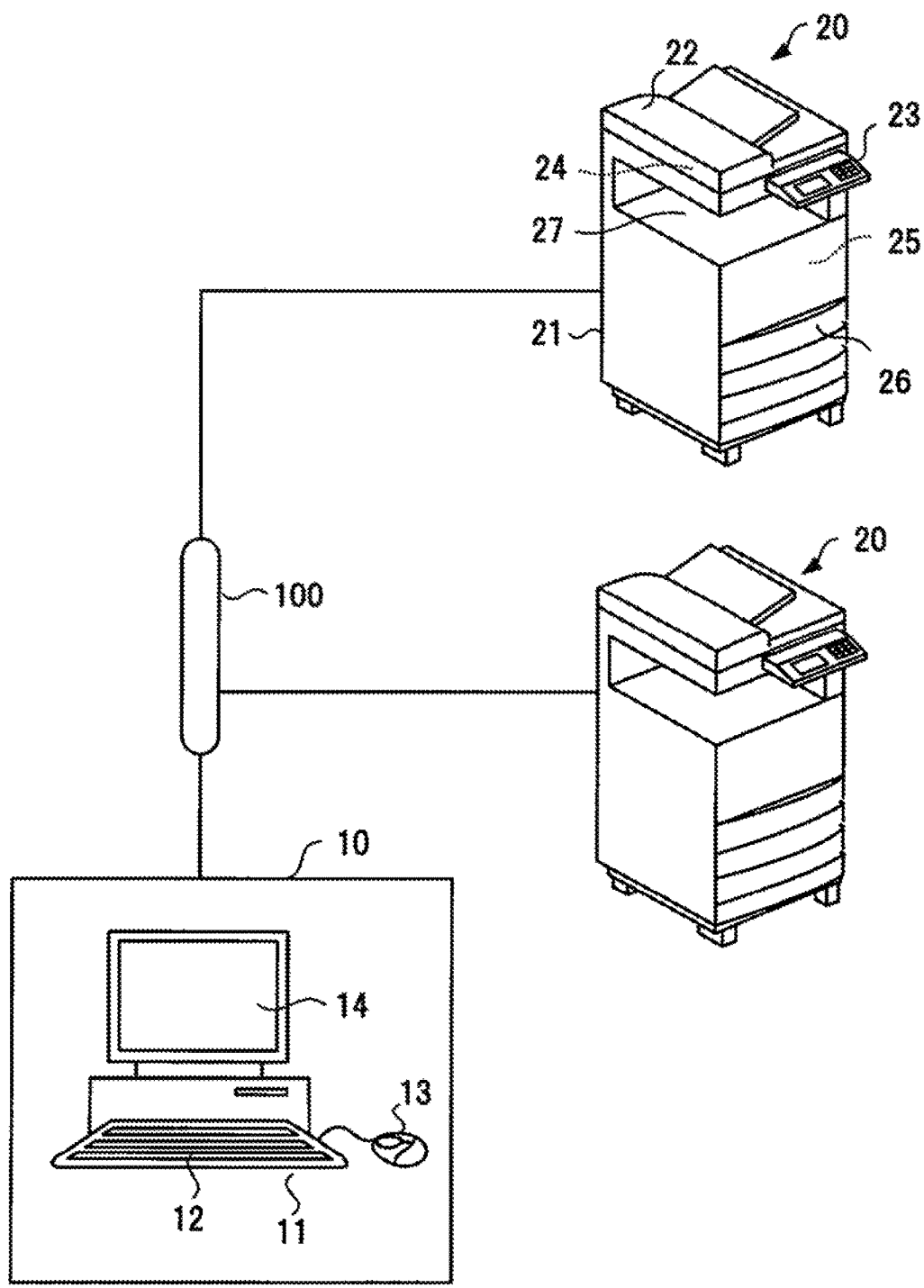
FIG. 1 illustrates an image forming system including an information processing apparatus and an image forming apparatus according to an embodiment.

FIG. 1 illustrates an entire image forming system, which includes an information processing apparatus 10 and at least an image forming apparatus 20 according to a first embodiment. In FIG. 1, the information processing apparatus 10 is connected to a plurality of the image forming apparatuses 20 via a network 100 such as a local area network (LAN) or the like. The information processing apparatus 10 and the image forming apparatus 20 communicate with each other via the network 100. In addition, in FIG. 1, although the two image forming apparatuses 20 are illustrated, one image forming apparatus or two or more image forming apparatuses may be included in the image forming system in the present embodiment.

The information processing apparatus 10 is, for example, a personal computer (PC) used by a user. Hereinafter, the information processing apparatus 10 is referred to as a PC 10. The PC 10 includes an input unit 11 which is operable by the user and a display unit 14 which displays various screens. The input unit 11 includes a keyboard 12 and a mouse 13.

The image forming apparatus 20 may be a multifunction peripheral (MFP), which is a multifunction printer, a printer, or the like. In FIG. 1, the MFP is illustrates as an example of the image forming apparatus 20. A document holder is provided on an upper portion of a main body 21 of the image forming apparatus 20, and an automatic document feeder (ADF) 22 is provided on the document holder openably. In addition, an operation panel 23 is provided on the upper portion of the main body 21. The operation panel 23 includes various operation keys and a touch-panel type display unit.

In addition, a scanner unit 24 is provided in a lower portion of the ADF 22 inside the main body 21. The scanner unit 24 scans a document fed by the automatic document feeder 22, or a document placed on the document holder to generate image data.

The main body 21 includes a printer unit 25 in a central portion thereof and a plurality of cassettes 26 which store sheets of various sizes in a lower portion thereof. The printer unit 25 includes a photoreceptor drum, a laser, or the like. The printer 25 forms (prints) an image on a sheet by processing image data generated by the scanner unit 24 or print data generated by the PC 10 or the like. The sheet printed by the printer unit 25 is discharged to a paper discharging unit 27.

Figure 2:
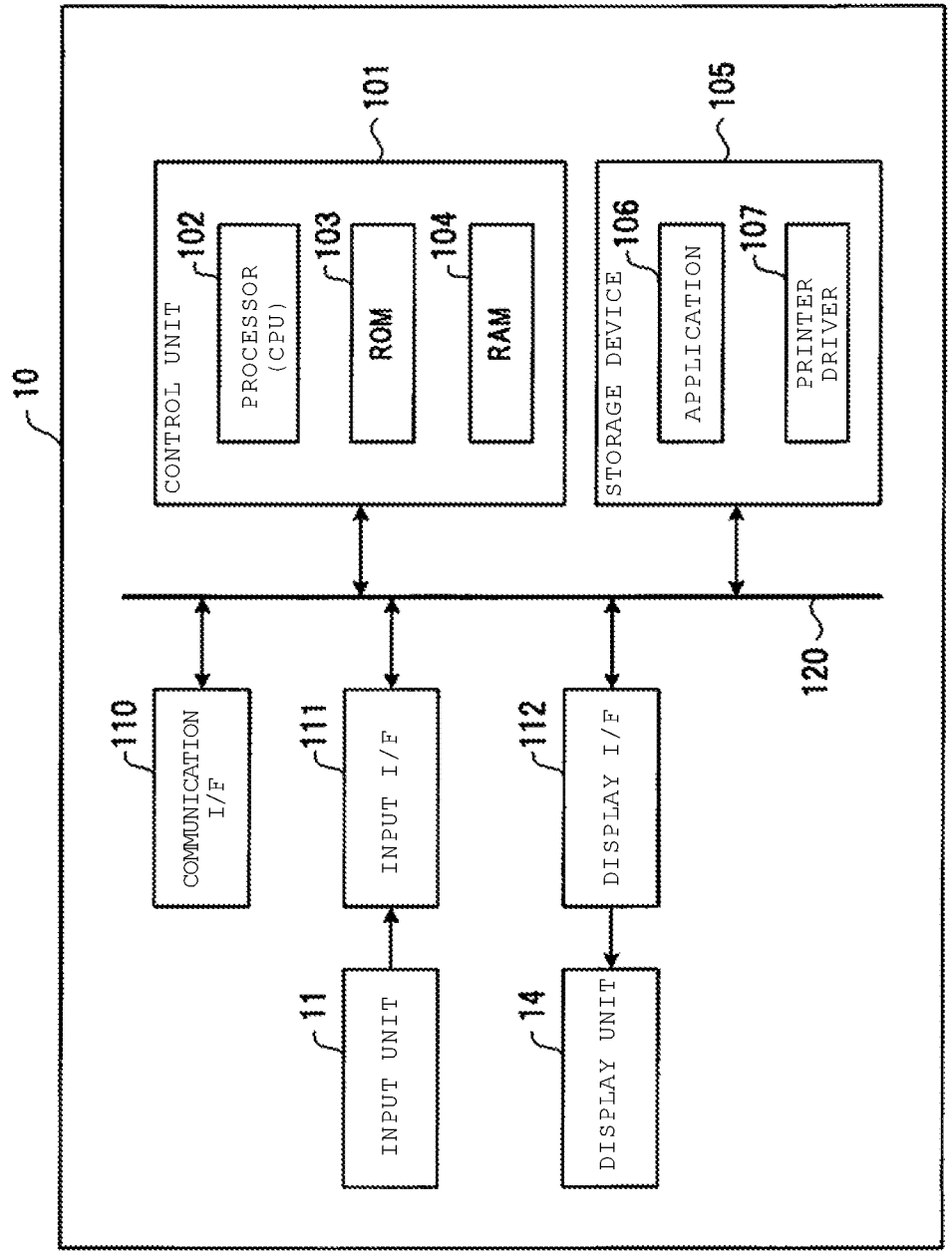
FIG. 2 is a block diagram of the information processing apparatus according to the embodiment.

FIG. 2 is a block diagram of the PC 10. The PC 10 is connected to the image forming apparatus 20 via the network such as the LAN 100 or the like. The PC 10 includes software to communicate with the image forming apparatus 20 and hardware.

The PC 10 includes a control unit 101, a storage device 105, a communication interface (communication I/F) 110, an input interface (input I/F) 111, an input unit 11, a display interface (display I/F) 112, and a display unit 14.

The control unit 101, for example, includes a processor 102 including a central processing unit (CPU), a read only memory (ROM) 103, and a random access memory (RAM) 104. The processor 102 controls an operation of the PC 10 according to a control program stored in the ROM 103. The RAM 104 provides a temporary work region for the processor 102. Respective units of the PC 10 are connected to each other via a bus 120.

The storage device 105 stores an application program 106 and a printer driver 107. In addition, the storage device 105 stores an operating system (OS), which is a program for managing the PC 10. The application program 106 is operated as software on the OS. The printer driver 107 is a driver which controls the image forming apparatus 20 according to a printing instruction from the application program 106. The storage device 105, for example, includes a hard disk drive (HDD) or a semiconductor storage device such as a flash memory or the like.

The communication I/F 110 is an interface which is connected to external apparatuses. For example, the communication I/F 110 is used to communicate with the image forming apparatus 20. That is, the control unit 101 communicates with the image forming apparatus 20 or other external apparatuses via the communication I/F 110. The input I/F 111 is connected to the input unit 11. As the input unit 11, a keyboard 12 or a mouse 13 is used as illustrated in FIG. 1. The display I/F 112 is connected to the display unit 14.

Figure 3:
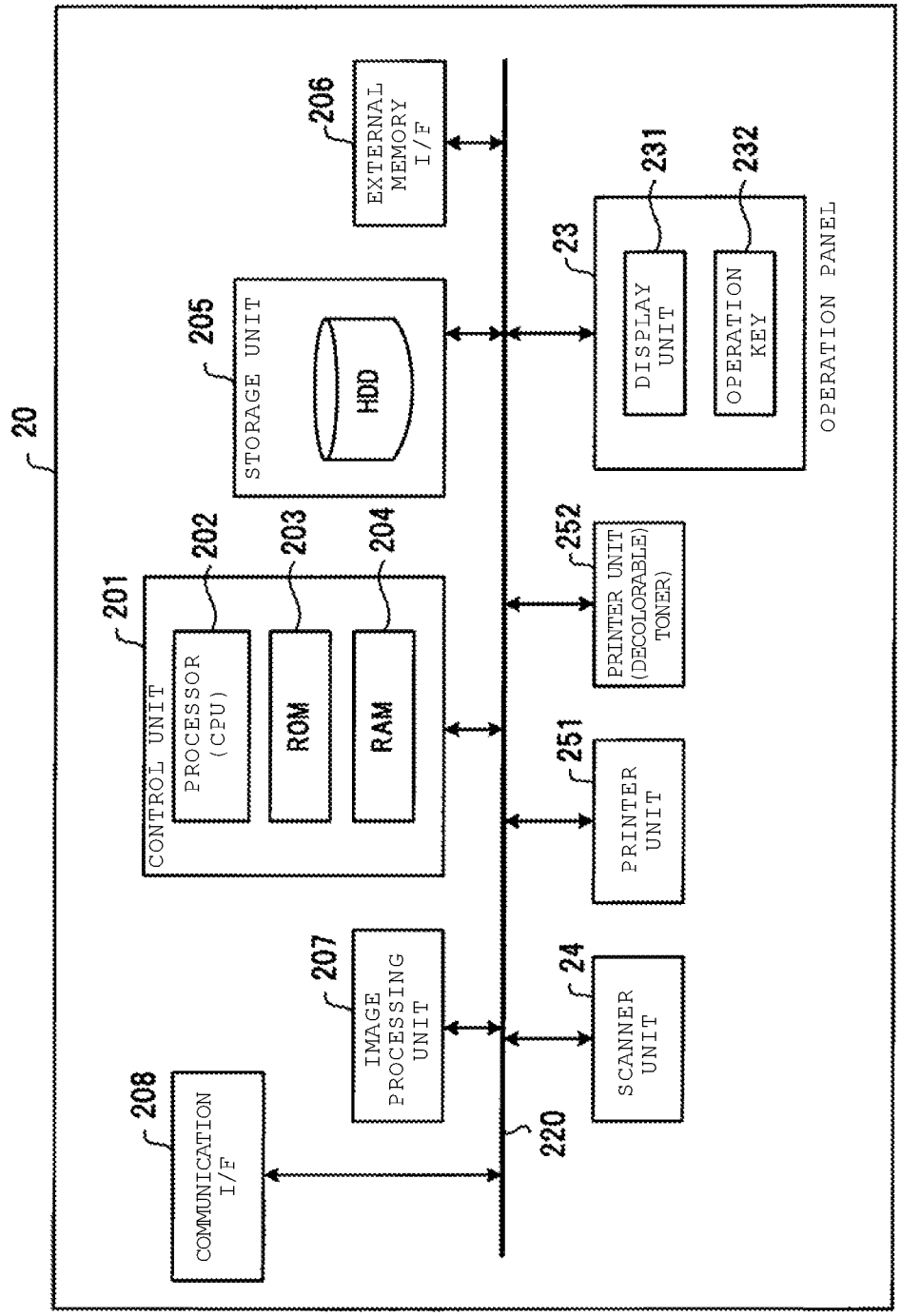
FIG. 3 is a block diagram of the image forming apparatus according to the embodiment.

FIG. 3 is a block diagram of the image forming apparatus 20. The image forming apparatus 20 includes a control unit 201, a storage unit 205, an external memory interface (I/F) 206, an image processing unit 207, and a communication interface (I/F) 208. In addition, the image forming apparatus 20 includes an operation panel 23, a scanner unit 24 which scans a document, and printer units 251 and 252 which form an image. Respective units of the image forming apparatus 20 are connected via a bus 220.

The control unit 201 includes, for example, a processor 202 including the CPU, a ROM 203, and RAM 204. Since the processor 202 controls overall operations of the image forming apparatus 20, the processor 202 serves as a printer control unit. The RAM 203 stores a control program of the processor 202. The RAM 204 provides a temporary work region for the processor 202.

The storage unit 205 stores an application program and an OS. The application program is executed to perform functions of the image forming apparatus, such as a copying function, a printing function, a scanning function, a faxing function, and a network filing function.

In addition, the storage unit 205 temporarily stores image data of a document scanned by the scanner unit 24, or print data obtained via the communication I/F 208. The storage unit 205, for example, includes a hard disk drive (HDD) or a semiconductor storage device such as a flash memory or the like.

The control unit 201 controls an operation panel 23, a scanner unit 24, printer units 251 and 252, an external memory I/F 206, an image processing unit 207 or the like, based on the control program stored in the ROM 203 or the storage unit 205. In addition, the control unit 201 may change the printing data stored in the storage unit 205 such that a setting screen is displayed on the display unit 231 and a user prints according to the set printing condition.

The scanner unit 24 generates image data after scanning a document fed by the ADF 22 (FIG. 1) or a document placed on the document holder. The printer units 251 and 252 form an image corresponding to image data of a document read out in the scanner unit 24 or print data transmitted from the PC 10 on a sheet. The printer unit 251, for example, forms an image with a non-decolorable toner of four colors such as cyan, magenta, yellow, and black. The printer unit 252 forms an image on a sheet with a decolorable agent (hereinafter, decolorable toner) which is erasable by an erasing device.

The external memory I/F 206 is used to communicate with a USB device or other external memories. The image processing unit 207 performs various kinds of image processing such as a tone correction or an edge detection with respect to printing target data obtained by the communication I/F 208 or the scanner unit 24. The image processing unit 207 includes, for example, an application specific integrated circuit (ASIC).

The communication I/F 208 is an interface which is connected to external apparatuses (for example, the PC 10). That is, the control unit 201 communicates with the PC 10, the USB device, and other external apparatuses via the communication I/F 208.

The operation panel 23 has a touch-panel type display unit 231 and various operation keys 232. The operation key 232 has, for example, a numeric key, a reset key, a stop key, a start key, or the like. In addition, an instruction regarding a sheet size and the number of copies can be performed by touching a menu screen displayed on the display unit 231. It is possible to input an instruction regarding printing conditions such as finishing (stapling, folding) or the like, or an instruction regarding a printing with a non-decolorable toner or a decolorable toner on the display unit 231. In this way, items displayed in the display unit 231 can be input as an instruction.

Next, a printing process of print data generated by the PC 10 and transmitted to the image forming apparatus 20 is described. The print data is data created by the application program 106. The application program 106 serves as a print data generating unit which generates print data. The print data may be, for example, WORD document data based on (WORD is software manufactured by Microsoft Corporation). The print data includes data such as a document, an image, a figure, or the like. The print data may be PDF data. The portable document format (PDF) is a file format developed by the Adobe System Inc.

The processor 102 performs generation of print setting information, creation or conversion of the print data, and selection of an image forming apparatus. The application program 106 and the printer driver 107 of the PC 10 are programs stored in the storage device 105. These programs are loaded to the RAM 104 by the processor 102 to be executed.

When the print data based on the application program 106 are transmitted to the image forming apparatus 20 to be printed, the print data are output to the printer driver 107. The printer driver 107 converts the received print data to a print description language (PDL) format in which the image forming apparatus 20 may recognize, and transmits the print data to the image forming apparatus 20 via the communication I/F 110.

The print data from the application program 106 are subject to image processing for an expansion and a reduction of images, Nin1 printing by which a plurality of pages is printed on one page, a duplex printing, or the like, based on the print setting information. The print setting information is displayed in a setting screen generated by the printer driver 107 and can be set via the input unit 11.

In addition, a security setting may be performed with respect to the print data based on the application program 106. The application program 106 is executed to display a property setting screen on the display unit 14. Through, the application program 106, a security attribute is added to the print data.

Figure 4:
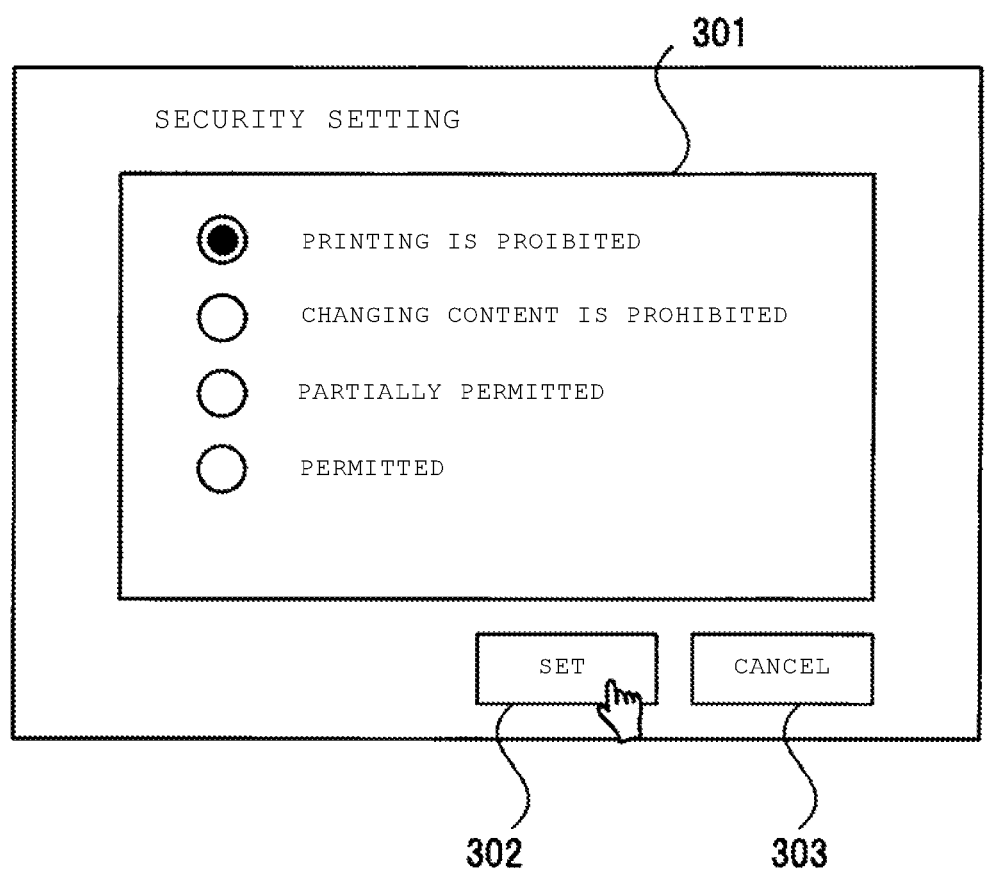
FIG. 4 illustrates an example of a security setting screen displayed on a display unit of the information processing apparatus according to the embodiment.

FIG. 4 is an example of a security setting screen in a property setting screen of the application program 106. In FIG. 4, a message screen 301, a set button 302, and a cancel button 303 are displayed. For example, when a user wants to restrict to print the print data by the image forming apparatus 20, a security setting screen is launched on the message screen 301.

In the security setting screen, printing with the decolorable toner can be restricted. For example, as illustrated in FIG. 4, it is possible to select the security setting of the print data generated by the PC 10 from one of attributes such as "prohibit printing", "prohibit content change", "partially permit printing", "permit printing" and the like.

The PC 10 sets a security level according to attributes selected in the security setting screen. The security setting may be performed through the application program 106 or a program which operates in coordination with the application program. Accordingly, the application program 106 serves as a security setting unit.

When the "prohibit printing" is selected, a security level is set to high (H) which prohibits all print data transmitted from the PC 10 from being printed (hereinafter, security level H). When the "prohibit content change" is selected, the PC 10 is prohibited from changing content of the print data. When the "partially permit printing" is selected, a part of the print data may be printed, but a designated part of the data is prohibited from being printed. For example, a document may be printed, but printing of image data is prohibited. In this case, the security level is set to middle (M) (hereinafter, a security level M). In addition, when the "partially permit printing" is selected, a part of the print data, for example, a text or an image may be extracted, or adding or changing a text comment or embedding an interactive form field may be permitted. In addition, when the "permit printing" is selected, all print data can be printed, and a security level is set to low (L) (hereinafter, security level L).

After a security attribute is selected in the security setting screen, when the set button 302 is selected, the security setting is fixed. In addition, when the cancel button 303 is selected, it is possible to reset the security level by cancelling the security setting. Therefore, it is possible to set a security level in accordance with security attributes depending on a confidentiality of print data generated by the PC 10.

After the security setting is completed, when an instruction to execute printing from a user is input via the input unit 11, a printing command is transmitted to the printer driver 107. The printer driver 107 adds print setting information including the security level to print data and transmits the print data to the image forming apparatus 20 based on the received printing command.

According to the security setting described above, it is possible to restrict printing of print data by the image forming apparatus 20 by performing the printing or a warning notification, based on the security information added to the print data.

Further, when the image forming apparatus 20 prints the print data for which any restriction of printing is set with a decolorable toner, it is possible to record history of the print job execution. In addition, in order to check falsification, the image forming apparatus may temporarily store the print data for which any restriction of printing is set in the storage unit 205, so that an administrator may reprint the print data.

Figure 5:
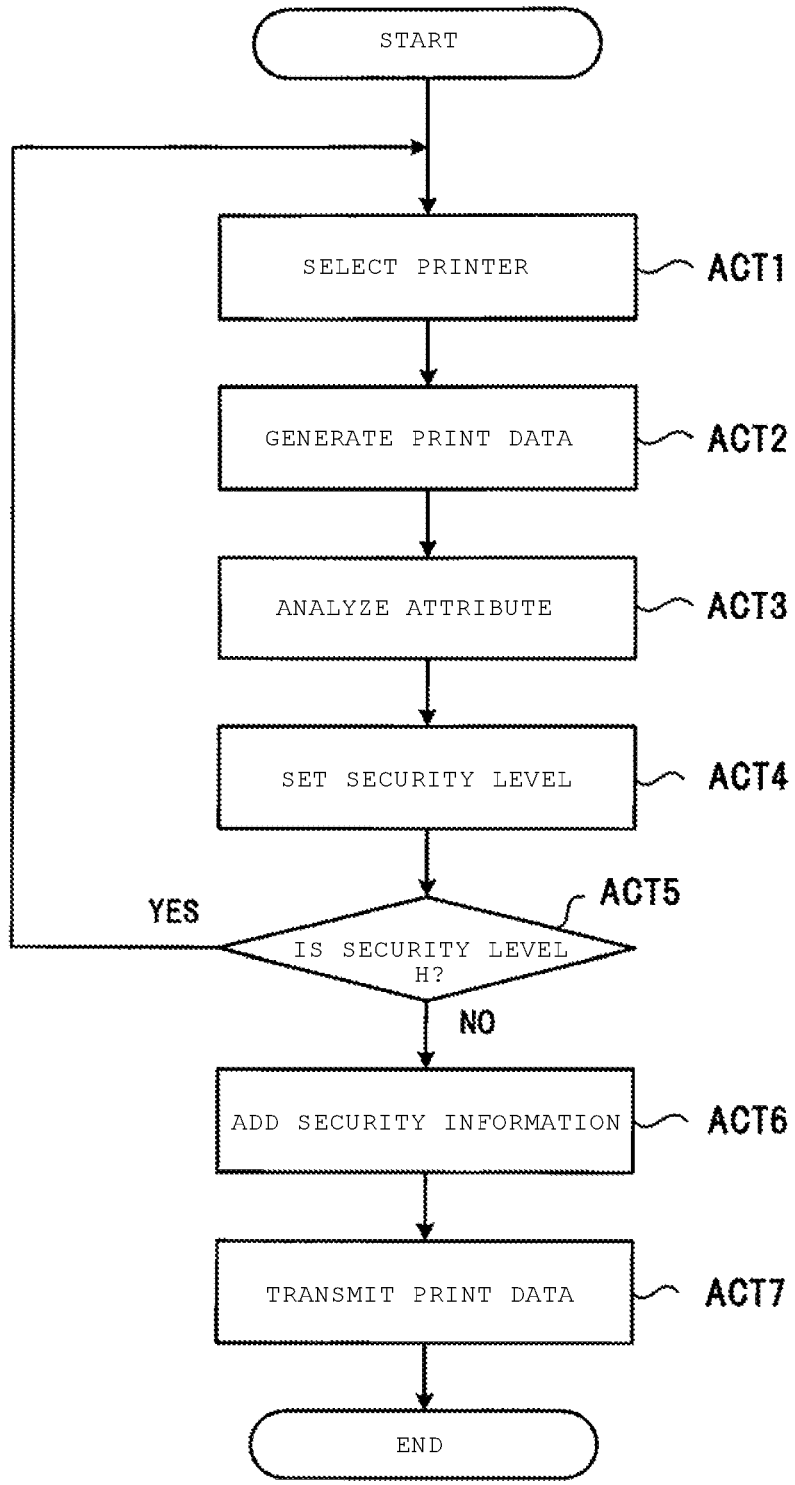
FIG. 5 is a flowchart illustrating a printing data generation process carried out by the information processing apparatus according to the embodiment.

FIG. 5 is a flowchart illustrating a print data generation process carried out by the PC 10. The process in FIG. 5 is carried out when the application program 106 and the printer driver 107 are executed by the processor 102 of the control unit 101. In addition, as the PC 10 has received information of the image forming apparatus 20 connected by the network 100 in advance, the PC 10 can determine whether the image forming apparatus 20 may print with a decolorable toner.

In ACT 1 of FIG. 5, the processor 102 selects a printer. Here, any one of the plurality of image forming apparatuses 20 is selected. In ACT 2, print data are generated by the application program 106. In ACT 3, when the print data are transmitted to the image forming apparatus 20, the application program 106 analyzes the attribute of the print data, in order to add security setting information to the print data. When analyzing the attribute, a security setting screen is displayed so that one of the attributes from as "prohibit printing", "prohibit content change", "partially permit printing", "permit printing" and the like.

In ACT 4, the processor 102 sets a security level based on the attribute analyzed in ACT 3. There are security levels such as a security level H at which printing of print data from the PC 10 is prohibited, a security level M at which changing content of the print data is prohibited or printing of the print data is partially prohibited, and a security level L at which printing of the print data is permitted.

In ACT 5, the printer driver 107 determines whether or not a security setting is set to a security level H. When the security setting is set to the security level H (YES in ACT 5), transmission of print data is prohibited, and a process returns to ACT 1. Meanwhile, when the security setting is set to security levels other than the security level H, in other words, a security level M or a security level L (NO, in ACT 5), the process proceeds to ACT 6.

In ACT 6, the printer driver 107 adds security information to the print data. Then, in ACT 7, the printer driver 107 transmits the print data including the security information to the image forming apparatus 20. It is possible to restrict a printing operation by the image forming apparatus 20 by adding the security information to the print data before transmitting the print data to the PC 10.

In ACT 5, the printer driver 107 determines whether or not the security setting is set to the security level H. Alternatively, the printer driver 107 may add the security setting to the print data as security information in ACT 6 without performing ACT 5. In this case, printing of the print data may be prohibited by the image forming apparatus 20 when the image forming apparatus 20 determines that the security information included in the print data indicates the security level H (ACT 16 in FIG. 6).

Figure 6:
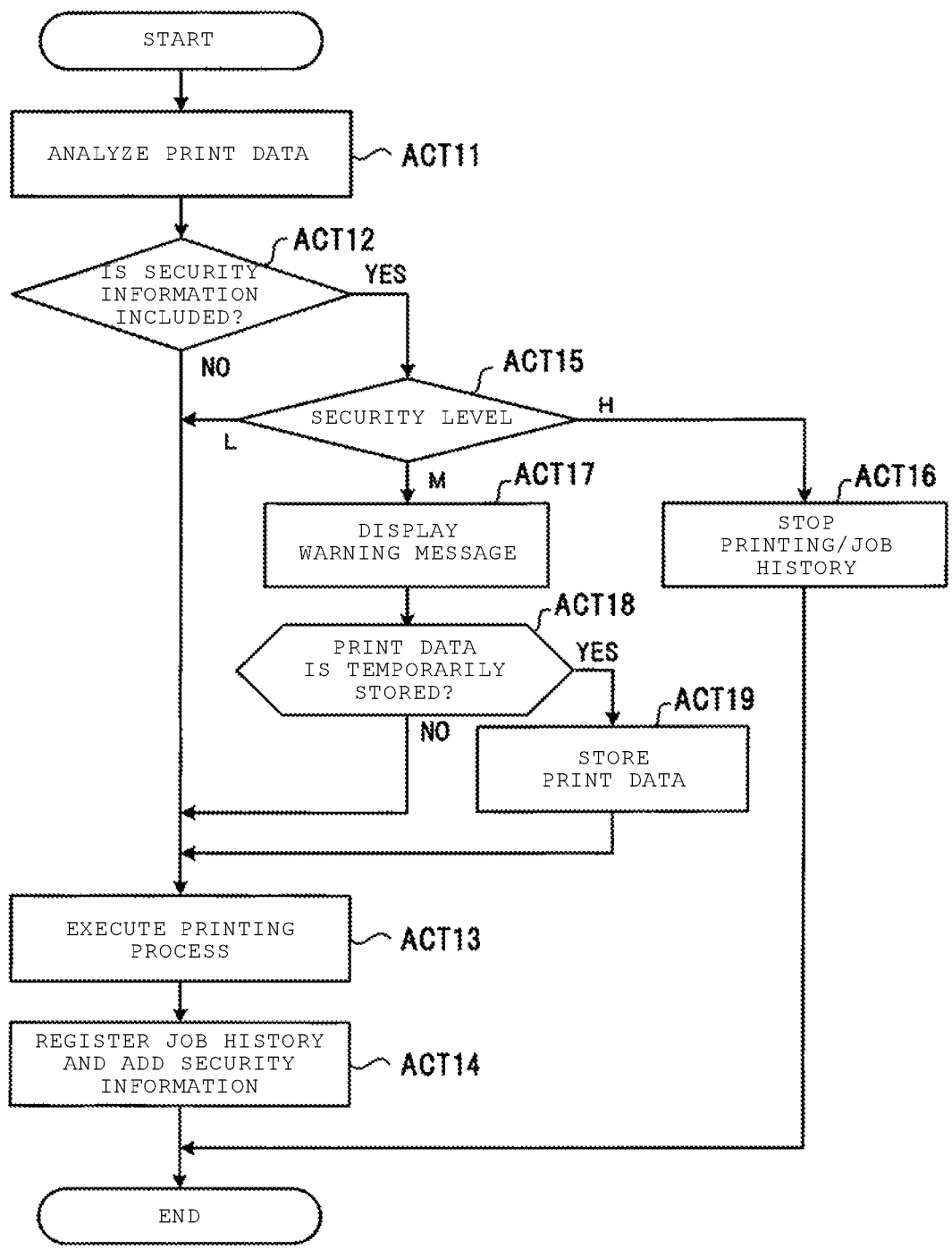
FIG. 6 is a flowchart illustrating a printing data process carried out by the image forming apparatus according to the embodiment.

FIG. 6 is a flowchart illustrating a process of processing the print data carried out by the image forming apparatus 20.

In FIG. 6, in ACT 11, the processor 202 analyzes the print data transmitted from the PC 10. In the print data, the following information may be included: a user name indicating who has created the data; a print type indicating whether the data is to be printed as it is or the data is to be printed after it is accumulated in the storage unit 205; and the security information, if any. When the security information is included, the processor 202 determines the security level. In this manner, the processor 202 determines, in ACT 12, whether the security information is set included in the print data.

When the security information is not included, in ACT 13, a printing process is executed and the print data is printed on a sheet. Then, in ACT 14, history information of the printing job is stored in the storage unit 205.

Meanwhile, if the processor 202 determines that the security information is included in the print data (YES in ACT 12), the process proceeds to ACT 15. In ACT 15, the processor 202 determines the security level set as the security information. For example, when the security level added to the print data is the security level H (H in ACT 15), it is determined that the security level is high and the printing process is interrupted. In addition, in ACT 16, the history information of the job is stored in the storage unit 205 and the process is finished. At this time, the history information of the job indicates that the printing has been prohibited since the print data which cannot be printed are received.

When the security level set as the security information added to the print data is the security level M (M in ACT 15), the processor 202 operates to display a warning (alert) message on the display unit 231 in ACT 17. A warning message, for example, "the print data for which a security level is set have been received" is displayed.

Meanwhile, when the security level is a security level L (L in ACT 15), a printing process is executed in ACT 13, in the same manner as when the security information is not included in the print data (NO in ACT 12), and history information of the printing job is stored in ACT 14.

In ACT 17, after the warning (alert) message is displayed, the processor 202 determines whether to store the print data in the storage unit 205 in ACT 18. This determination is executed by referring to setting data added by the image forming apparatus in advance. If a temporary storage of the print data is not set (NO in ACT 18), a printing process is executed in ACT 13 without storing the print data. In addition, in ACT 14, history information of the job is stored in the storage unit 205 together with the security information, and the process is finished.

Meanwhile, in ACT 18, if a temporary storage of the print data is set (YES in ACT 18), the print data is temporarily stored in the storage unit 205 in ACT 19. After the print data are stored in the storage unit 205, a printing process is executed in ACT 13. Then, in ACT 14, history information of the job is stored in the storage unit 205 together with the security information, and the process is finished.

Here, if the security level is low, history information of a job and security information are stored in the storage unit 205. If the security level is high, print data may be stored in the storage unit 205 with the history information of a job and the security information.

The print data stored in ACT 19 are read out from the storage unit 205 later, and may be used for checking falsification of the print data. In addition, it is possible for an administrator to confirm, for example, who printed which print data later, using the history information of a job and the security information stored in the storage unit 205 in ACT 14.

In addition, the print data or the history information of a job, and security information may be stored in a unit other than the storage unit 205, for example, in an external memory connected to an external memory I/F 206.

As described above, in the image forming apparatus 20 according to the present embodiment, it is possible to restrict printing with a decolorable toner using a security attribute of print data. Accordingly, it is possible to restrict printing of print data which are likely to be falsified by setting an appropriate security level for the print data.

In addition, according to the security attribute of the print data, it is possible to display a warning when the print data is printed with a decolorable toner, record history information of a print job when the print data for which a printing restriction is set, so that falsification of the print data can be checked.

In addition, the exemplary embodiment is not limited to the above described embodiment, and may be applied for various purposes. For example, the image forming apparatus 20 is not limited to an MFP, but may be a printer.

While certain embodiments have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses described herein may be made without departing from the spirit of the inventions. The accompanying claims and their equivalents are intended to cover such forms or modifications as would fall within the scope and spirit of the inventions.

What is claimed is:

1. A printing apparatus comprising:
   a data storage;
   a first printer configured to perform printing with a decolorable material;
   a communication interface; and
   a controller configured to
      determine a security level of print data received by the communication interface, based on security setting data for the print data, that is received by the communication interface,
      when determining that the security level is a first security level, control the first printer to print the print data with the decolorable material and control the data storage to store the print data and the security setting data for the print data received by the communication interface, and
      when determining that the security level is a second security level that is lower than the first security level, control the first printer to print the print data with the decolorable material and control the data storage not to store the print data and store the security setting data for the print data received by the communication interface in the data storage.

2. The printing apparatus according to claim 1, wherein when the controller determines that the security level is the first security level, the controller causes the first printer to partially print the print data with the decolorable material.

3. The printing apparatus according to claim 1, wherein when the security level is the second security level, the controller causes the first printer to print all the print data with the decolorable material.

4. The printing apparatus according to claim 2, further comprising:
   a display unit, wherein
   the controller controls the display unit to display an alert message indicating that restriction on printing is set for the print data.

5. The printing apparatus according to claim 2, wherein when the security level is the first security level, the controller causes the data storage to store a history information of the printing job together with the security setting data, with respect to each of the print data.

6. The printing apparatus according to claim 3, wherein
when the security level is the second security level, the controller causes the data storage to store a history information of the printing job together the security setting data.

7. The printing apparatus according to claim 5, wherein the controller is further configured to
determine whether or not the security setting data indicates that the print data is to be stored when the security level thereof is the first security level, and
cause the data storage to store the print data when determining the security setting data indicates that the print data is to be stored.

8. The printing apparatus according to claim 1, further comprising:
a second printer configured to perform printing with a non-decolorable material, wherein
the print data indicates an image is to be printed based on the print data with the decolorable material or the non-decolorable material,
when the print data indicates that at least part of the image is to be printed with the decolorable material, the controller controls the first printer and the data storage based on the determined security level, and
when the print data indicates that the entire image is to be printed with the non-decolorable material, the controller controls the second printer to print the print data.

9. A method for controlling a printing apparatus including a data storage, a first printer configured to perform printing with a decolorable material, and a communication interface, the method comprising:
determining a security level of print data received by the communication interface, based on security setting data for the print data, that is received by the communication interface;
when determining that the security level is a first security level, controlling the first printer to print the print data with the decolorable material and controlling the data storage to store the print data and the security setting data for the print data received by the communication interface; and
when determining that the security level is a second security level that is lower than the first security level, controlling the first printer to print the print data with the decolorable material and controlling the data storage not to store the print data and store the security setting data for the print data received by the communication interface in the data storage.

10. The method according to claim 9, wherein
when determining that the security level is the first security level, causing the first printer to partially print the print data with the decolorable material.

11. The method according to claim 9, wherein
when the security level is the second security level, causing the first printer to print all the print data with the decolorable material.

12. The method according to claim 10, wherein
the printing apparatus further comprises:
a display unit, and
the method further comprises:
controlling the display unit to display an alert message indicating that restriction on printing is set for the print data.

13. The method according to claim 10, wherein
when the security level is the first security level, causing the data storage to store a history information of the printing job together with the security setting data, with respect to each of the print data.

14. The method according to claim 11, wherein
when the security level is the second security level, causing the data storage to store a history information of the printing job together the security setting data.

15. The method according to claim 13, further comprising:
determining whether or not the security setting data indicates that the print data is to be stored when the security level thereof is the first security level, and
causing the data storage to store the print data when determining the security setting data indicates that the print data is to be stored.

16. The method according to claim 9, wherein
the printing apparatus further comprises:
a second printer configured to perform printing with a non-decolorable material,
the print data indicates an image is to be printed based on the print data with the decolorable material or the non-decolorable material, and
the method further comprises:
when the print data indicates that at least part of the image is to be printed with the decolorable material, controlling the first printer and the data storage based on the determined security level, and
when the print data indicates that the entire image is to be printed with the non-decolorable material, controlling the second printer to print the print data.

* * * * *